DEFLECTION WAVEFORM GENERATOR AND AMPLIFIER

Filed May 7, 1962

INVENTOR:
MAX H. DIEHL,

BY Richard V. Lang
HIS ATTORNEY.

United States Patent Office 3,178,593

Patented Apr. 13, 1965

3,178,593

DEFLECTION WAVEFORM GENERATOR AND AMPLIFIER

Max H. Diehl, Manlius, N.Y., assignor to General Electric Company, a corporation of New York Filed May 7, 1962, Ser. No. 192,859
2 Claims. (Cl. 307—88.5)

Figure 1:
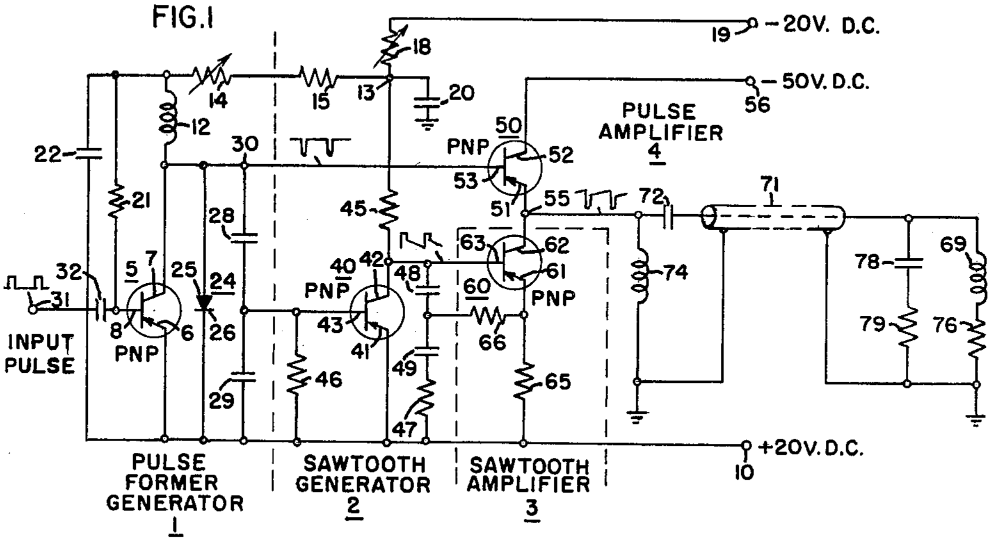

This invention relates to the generation of a waveform for application to a deflection coil and, in particular, to the creation of a complex deflection waveform suitable for remote operation of a television camera.

In producing deflection signals for a remotely placed television camera, a complex waveform comprising a pluse component and a sawtooth component is usually required. This waveform is applied through a coaxial cable to the horizontal deflection coil to produce therein a sawtooth current wave as is required to properly deflect the electron beam in the camera. Generation of this complex waveform in a single amplifier is wasteful of power and necessitates a high voltage power supply. Prior art systems in which the pulse and sawtooth components have been separately generated and amplified have failed to provide maximum efficiency of operation. It is desirable that the supply voltage level and power supply requirements of the television camera be minimized. Accordingly, the defects of the prior art systems in this regard have been overcome by the circuit of the invention.

It is an object of the invention to provide an improved generating and amplifying circuit for complex waveforms.

It is an object of the invention to provide an improved generating circuit for producing the complex pulse and sawtooth waveform required to produce a sawtooth of current in a remotely placed deflection coil.

It is another object of the invention to provide a circuit for independently generating the components of a complex waveform and amplifying them on a time-sharing basis to attain maximum efficiency.

It is another object of the invention to provide a transistorized circuit for independently generating and amplifying the pulse and sawtooth components of a deflection waveform with improved efficiency.

It is a further object of the invention to provide such a circuit which permits adjustment of size and linearity.

Briefly stated, in accordance with the illustrated embodiment of the invention, generation of a complex waveform, including a pulse component and a sawtooth component, is effected by forming the respective components and amplifying them separately in serially connected, time-sharing amplifiers, the amplified components being added prior to application to the deflection coil. The pulse component of the complex waveform is formed in a resonant circuit which is excited by virtue of the application of a series of synchronizing input pulses to a switching device associated with the resonant circuit. The sawtooth component of the complex waveform is formed by application of a portion of the generated pulse component to a switching device connected to a resistance-capacitance network. The output stage comprises a pair of amplifying devices serially connected across a source of energizing potential. The pulse component is applied to the first amplifying device while the separately formed sawtooth component is applied to the second amplifying device. The pulse and sawtooth components are timed so that the second or sawtooth amplifier is non-conductive during the period when the first or pulse amplifier is amplifying the pulse component, thereby minimizing the voltage drop across the pulse amplifier and minimizing the power loss therein. Thus, the pulse amplifier operates with class "C" efficiency. The sawtooth amplifier operates in the linear range of its characteristics and is conductive throughout the major portion of the cycle, thereby operating with class "AB" efficiency. The amplified pulse and sawtooth components are added at the common connection of the respective amplifiers and the resulting complex wave is provided for application through a cable to the deflection coil.

The subject matter of the invention is particularly pointed out and distinctly claimed in the concluding portion of the specification. The invention, however, may best be understood by reference to the following description taken in connection with the accompanying drawing, in which:

FIG. 1 is a circuit diagram of the deflection waveform generating and amplifying circuit of the invention; and FIGS. 2A–2D illustrate voltage waveforms present at various points in the circuit of FIG. 1.

With reference to FIG. 1, the circuit of the invention, considered as a whole, comprises a pulse former 1, a sawtooth generator 2, a sawtooth amplifier 3 and a pulse amplifier 4. The pulse former 1 produces a pulse train comprising half cycles of a sine wave in response to applied synchronizing drive pulses. The pulse train is applied to the pulse amplifier 4 and is also applied to a voltage divider to produce a drive signal for the sawtooth generator 2. The sawtooth generator output is applied to the sawtooth amplifier 3. In accordance with this invention, amplifiers 3 and 4 are serially connected, the output being taken from their common connection. The pulse amplifier 4 conducts for a small portion of the cycle during which the sawtooth amplifier 3 is non-conductive and operates class "C." The sawtooth amplifier 3 conducts for the remainder of the cycle and operates class "AB." The complex waveform comprising the pulse and sawtooth components, available at the common connection of the pulse and sawtooth amplifiers, is applied to a coaxial cable 71 for transmission to the horizontal deflection coil of a remote television camera.

Figures 2A, 2B, 2C, 2D:
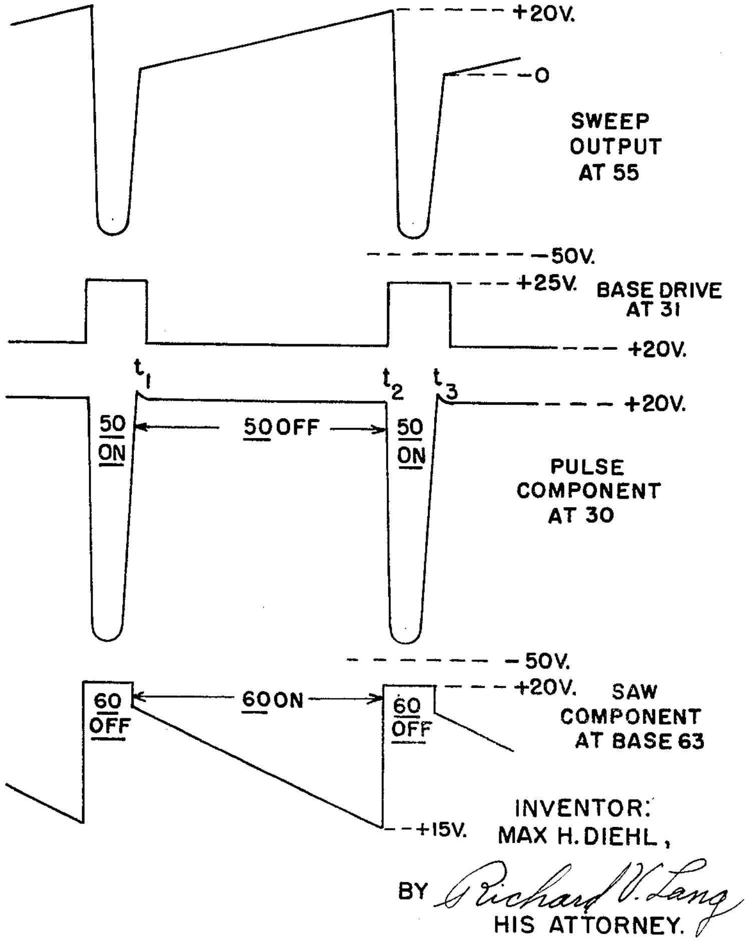

The pulse former 1 of the circuit of the invention includes a switching transistor 5 of the PNP type having a base electrode 8, an emitter electrode 6, and a collector electrode 7. Positive going synchronizing pulses, as illustrated in FIG. 2B, are applied from terminal 31, through coupling capacitor 32 to base electrode 8. Emitter electrode 6 of transistor 5 is connected to terminal 10 which is, in turn, connected to a D.C. potential source of +20 volts. Collector electrode 7 of transistor 5 is connected to a terminal of inductor 12, the other terminal of inductor 12 being connected to circuit point 13 through variable resistor 14 and fixed resistor 15. Circuit point 13 is energized through variable resistor 18 from terminal 19 which is connected to a D.C. potential source of —20 volts. Capacitor 20 is connected between circuit point 13 and ground. Base electrode 8 and emitter electrode 6 of transistor 5 are connected to the common connection of inductor 12 and variable resistor 14 through resistor 21 and capacitor 22 respectively.

The output circuit of pulse former 1 includes a diode 24, having anode electrode 25 and cathode electrode 26, connected across the emitter-collector circuit of transistor 5, with anode electrode 25 being connected to collector electrode 7 and cathode electrode 26 being connected to emitter electrode 6. The serial combination of capacitors 28 and 29 is also connected across the emitter-collector circuit of transistor 5 with a terminal of capacitor 28 being connected to collector electrode 7 and a terminal of capacitor 29 being connected to emitter electrode 6. Capacitors 28 and 29, in conjunction with inductor 12, form a resonant circuit. Diode 24 functions as a damper diode, preventing positive voltage excursions at the circuit point 30. This circuit point is the common connection of capacitor 28, inductor 12, diode 24 and collector electrode 7 of transistor 5 and is the point at which pulse waveform 2C appears.

The sawtooth generator 2 of the circuit of the invention includes PNP type transistor 40 having base electrode 43, emitter electrode 41 and collector electrode 42. The base electrode 43 is connected to the common connection of capacitors 28 and 29 which functions as a voltage divider to apply a desired portion of the waveform 2C to the transistor 40. Resistor 46 is connected between the base and emitter electrodes 43 and 41 respectively of transistor 40. Emitter electrode 41 of transistor 40 is connected to terminal 10, while the collector electrode 42 is connected to circuit point 13 through resistor 45. A serial combination of resistor 47 and capacitors 48 and 49 is connected across the emitter-collector circuit of transistor 40; a terminal of capacitor 48 being connected to collector electrode 42 and a terminal of resistor 47 being connected to emitter electrode 41. The circuit thus provides that the transistor 40 will normally be in a cut-off condition, during which period a sawtooth voltage is being generated at the collector of transistor 40 by the charging up of capacitor 48 through resistor 45 primarily. Upon the application of a pulse from the capacitor divider to the base electrode 43, transistor 40 becomes conductive and discharges the capacitor 48. The elements 47, 49, 66 and subsequent transistor 60 have a secondary role in wave shaping to be described below. The sawtooth waveform 2D is that appearing at the collector electrode 42 of transistor 40.

In accordance with the invention, the waveform combining portion of the circuit comprises a pair of amplifiers serially connected across the energizing potential. The pulse amplifier 4 includes a transistor 50 of the PNP type coupled in emitter follower configuration having a base electrode 53, a collector electrode 52 and an emitter electrode 51. Base electrode 53 is coupled to circuit point 30 for application thereto of the pulse waveforms 2C. The collector electrode 52 is connected to terminal 56, which is energized from a D.C. potential source of −50 volts. The emitter electrode 51 is coupled to circuit point 55 at which the output of transistor 50 is derived.

The sawtooth amplifier 3 includes PNP type transistor 60 having base electrode 63, emitter electrode 61 and collector electrode 62. Base electrode 63 is coupled to the collector 42 of transistor 40 by which means waveforms 2D are applied to transistor 60. Emitter electrode 61 of transistor 60 is connected to terminal 10 through resistor 65. Resistor 66 is connected between emitter electrode 61 and the common connection of capacitors 48 and 49. The collector electrode 62 is also connected to circuit point 55 at which the output of transistor 60 is derived.

In accordance with the foregoing circuit description, pulse amplifying transistor 50 and sawtooth amplifying transistor 60 are serially connected through their respective emitter-collector circuits, between terminals 10 and 56, which are energized with D.C. potentials of +20 and −50 volts respectively. The amplified pulse and sawtooth components of the complex wave are thus added at circuit point 55, the common connection of sawtooth amplifier 3 and pulse amplifier 4. The complex wave so produced is illustrated in FIG. 2A. It is applied to the horizontal deflection coil 69 of a remote television camera through coaxial cable 71, capacitor 72 serving to block D.C. components which are shunted to ground through inductor 74. Resistor 76 is connected between one terminal of deflection coil 69 and ground while the serial combination of capacitor 78 and resistor 79 is connected between the other terminal of the deflection coil and ground. Capacitor 78 and resistors 76 and 79, in conjunction with deflection coil 69, present a characteristic 50 ohm resistive terminating impedance to coaxial cable 71. As shown, the outer conductor of the coaxial cable is connected to ground.

Considering now the operation of the circuit as a whole; transistor 5 in the pulse forming portion of the circuit is normally conductive. Application of a positive drive pulse, shown in FIG. 2B, to the base electrode 8 of transistor 5 drives the transistor to cutoff. The sudden change in current flowing through inductor 12 induces a sinusoidal oscillation in the series resonant circuit comprising inductor 12 and capacitors 28 and 29. The sinusoidal oscillation exists only during the period of non-conduction of transistor 5. Damper diode 24 is poled so as to be conductive when the circuit point 30 is positive with respect to terminal 10 and hence only the negative portion of the sinusoidal oscillation appears at circuit point 30, as shown in FIG. 2C. Thus, the pulse generator output appearing at circuit point 30 comprises the negative half of a sine wave. The period T of the pulse is established by the magnitude of the inductance of inductor 12 and the capacitance of serially-connected capacitors 28 and 29.

The negative pulse of FIG. 2C, appearing at circuit point 30, is applied to the base electrode 53 of pulse amplifying transistor 50. The pulse is also applied to the sawtooth waveform generating portion of the circuit comprising transistor 40. Capacitors 28 and 29 function as voltage dividers, applying a fraction of the negative pulse available at circuit point 30 to base electrode 43 of transistor 40, the fraction being approximately equal to the ratio of the capacitance values of capacitors 28 and 29. The impedance looking back from the base electrode 43 is reduced approximately as the square of this ratio. Thus, transistor 40, which is normally non-conductive, is periodically driven into conduction by a small negative pulse from a low-impedance source, the small negative pulse being derived from the output of the pulse generator portion of the circuit appearing at circuit point 30

Upon termination of conduction in transistor 40, which discharges capacitors 48 and 49 through the emitter-collector path, capacitors 48 and 49 commence charging through resistor 45 to the more negative potential available at circuit point 13. As shown in FIG. 2D, the potential at collector electrode 42 of transistor 40 increases linearly in a negative direction during the period from time $t_1$ to $t_2$. At time $t_2$, transistor 40 is again rendered conductive by virtue of the application of a negative pulse of voltage from circuit point 30 to base electrode 43. Capacitors 48 and 49 then discharge through the emitter-collector path of transistor 40, the potential at collector electrode 42 rapidly increasing to a maximum, as shown in FIG. 2D. Transistor 40 remains conductive for the period of the pulse at circuit point 30. Resistor 47 in series with the capacitors 48 and 49 functions to provide the pedestal on the sawtooth wave as shown between time $t_2$ and time $t_3$ in FIG. 2D. Upon termination of the negative pulse at circuit point 30, transistor 40 is again cut off and capacitors 48 and 49 commence charging toward the potential of circuit point 13. Thus, the voltage waveform shown in FIG. 2D appears at the collector electrode 42 of transistor 40.

The voltage waveform of FIG. 2C is applied to base electrode 53 of pulse-amplifying transistor 50 while the voltage waveform of FIG. 2D is applied to base electrode 63 of sawtooth amplifying transistor 60. As previously described, transistors 50 and 60 are serially connected between terminals 10 and 56 to which energizing potentials are applied, the amplified outputs of the transistors being added at circuit point 55 which is the common connection of the transistors.

Pulse amplifying transistor 50 is connected in a common collector configuration having approximately unity voltage gain and high current gain. The application of the waveform of FIG. 2C to base electrode 53 renders transistor 50 conductive between time $t_2$ and time $t_3$. The amplified pulse output appears at circuit point 55. As will be described subsequently, between time $t_2$ and time $t_3$ transistor 60 is non-conductive, thereby minimizing the voltage drop across transistor 50. Maximum conduction of transistor 50 thus occurs when the voltage drop across its emitter-collector path is a minimum. Transistor 50 is rendered non-conductive between time $t_1$ and $t_2$. Thus, pulse amplifying transistor 50 operates with class "C" efficiency, consuming minimum power.

Sawtooth amplifying transistor 60 is connected in a common emitter configuration having voltage gain and high current gain. The pedestal on the waveform of FIG. 2D, which is applied to base electrode 63, renders transistor 60 non-conductive between time $t_2$ and time $t_3$, thus maximizing the voltage drop across its emitter-collector path. The pedestal also increases the linearity of the sawtooth by precluding operation of transistor 60 in the low-current, non-linear region of its characteristics. At time $t_3$, transistor 60 is biased to conduction by the sawtooth portion of the applied waveform and serves to amplify and invert the sawtooth voltage. Transistor 60 operates in the linear portion of its characteristics and with class "AB" efficiency. The amplified inverted sawtooth output appears at circuit point 55.

Thus, between time $t_1$ and time $t_2$, pulse amplifying transistor 50 is cut off and sawtooth amplifying transistor 60 is conductive. The latter operates with class "AB" efficiency. Between time $t_2$ and time $t_3$, pulse amplifying transistor 50 is conductive and sawtooth amplifying transistor 60 is a non-conductive. The former operates with class "C" efficiency. The waveform appearing at circuit point 55, the common connection of serially connected transistors 50 and 60, is shown in FIG. 2A and comprises the added outputs of the respective amplifiers. The complex waveform is applied to deflection coil 69 through coaxial cable 71 to provide linear deflection of an electron beam.

Variable resistor 14 is provided to vary the D.C. voltage applied to the pulse former, including transistor 5, inductor 12, and capacitors 28 and 29, thereby controlling the amplitude of the generated pulse available at circuit point 30. In this manner, the amplitude ratio of the sawtooth and pulse components can be varied to adjust the linearity of the sweep current in the deflection coil 69.

In both the sawtooth generation and the pulse formation portions of the circuit, the amplitude of the respective waveforms is a linear function of the D.C. voltage applied. Variable resistor 18 is provided to adjust the D.C. voltage applied to circuit point 13 to thereby control the size of the output waveform at circuit point 55 without varying the pulse to sawtooth amplitude ratio. In other words, adjustment of resistor 18 provides a convenient means for adjusting the pulse and the sawtooth components together. At the remotely energized camera, it may be seen, the maintenance of these relative proportions permits this size adjustment to occur without disturbing the linearity of the sweep current.

Although the invention and its operation has been described with reference to a specific embodiment, the invention is not to be limited to this embodiment, and it is intended in the appended claims to claim all such variations as fall within the true spirit of the present invention.

What is claimed is:

1. A circuit for developing in a load recurring sawtooth waves and pulses of current comprising:

means for developing recurring pulses of voltage, means for developing recurring sawtooth waves of voltage, each sawtooth wave being in time relation to a respective one of said recurring pulses, an amplifier including a PNP transistor having an emitter, base and collector, a source of operating voltage and said load connected in circuit in the order named between said collector and said emitter, means for applying said pulses of voltage in circuit with said base and said load to develop corresponding pulses of current in said load, another amplifier including another PNP transistor having an emitter, a base and a collector, said load and another source of operating voltage connected in circuit in the order named between said collector and said emitter, the collector of said other amplifier being conductively connected to the emitter of said one amplifier, means for applying said sawtooth waves of voltage in circuit with said base and said emitter to develop corresponding sawtooth waves of current in said load.

2. A circuit for developing periodically recurring sawtooth waves and pulses of current in a load comprising:

means for developing a series of periodically recurring pulses of voltage, means for developing periodically recurring sawtooth waves of voltage, each sawtooth wave being synchronized with a respective one of said recurring pulses, an amplifier including a transistor of one conductivity type having an emitter, base and collector, a source of operating voltage and said load connected in circuit in the order named between said collector and said emitter, means for maintaining said one amplifier non-conductive during the non-occurrence of said pulses, means for applying said pulses of voltage to said amplifier in circuit with said base and said load to develop corresponding pulses of current in said load, another amplifier including another transistor of said one conductivity type having an emitter, a base and a collector, said load and another source of operating voltage connected in the order named between said collector and said emitter, means for deriving another series of pulses time coincident with said one series of pulses and applying said pulses to the input of said other amplifier to maintain said other amplifier non-conductive during the occurrence of said one series of pulses, means for applying said sawtooth waves of voltage to said amplifier in circuit with said base and said emitter to develop corresponding sawtooth waves of current in said load.

References Cited by the Examiner

UNITED STATES PATENTS 2,964,673 12/60 Stanley ---------------- 330—15
3,070,727 12/62 Birt ------------------ 328—181

OTHER REFERENCES

"Transistors in Television Receivers," by Bryan R. Overton, Journal of the Television Society, vol. 8, No. 11, 1958, pp. 463–467 relied on.

JOHN W. HUCKERT, *Primary Examiner.*

DAVID J. GALVIN, *Examiner.*